United States Patent

Brun, Jr. et al.

[11] Patent Number: 5,536,164
[45] Date of Patent: Jul. 16, 1996

[54] FLEXIBLE HOT MANIFOLD ASSEMBLY FOR INJECTION MOLDING MACHINES

[75] Inventors: Charles J. Brun, Jr., Xenia; Anthony F. Newport, New Carlisle, both of Ohio

[73] Assignee: Electra Form, Inc., Vandalia, Ohio

[21] Appl. No.: 435,941

[22] Filed: May 5, 1995

[51] Int. Cl.⁶ .................................. B29C 45/22
[52] U.S. Cl. .............. 425/547; 264/297.2; 264/297.8; 425/562; 425/570; 425/572
[58] Field of Search .................... 425/572, 588, 425/570, 562, 547; 264/297.2, 297.8

[56] References Cited

U.S. PATENT DOCUMENTS

| | | | |
|---|---|---|---|
| 3,718,166 | 2/1973 | Gordon | 425/570 |
| 4,219,323 | 8/1980 | Bright et al. | 425/572 |
| 4,333,629 | 6/1982 | Roy | 425/572 |
| 4,340,156 | 7/1982 | Muller | 425/549 |
| 4,588,367 | 5/1986 | Schad | 425/572 |
| 4,609,138 | 9/1986 | Harrison | 425/572 |
| 4,761,343 | 8/1988 | Gellert | 425/588 |
| 4,768,283 | 8/1988 | Gellert | 425/572 |
| 4,964,795 | 10/1990 | Tooman | 425/572 |
| 5,028,227 | 7/1991 | Gellert et al. | 425/549 |
| 5,032,078 | 7/1991 | Benenati | 425/572 |
| 5,096,411 | 3/1992 | Gellert | 425/588 |
| 5,147,663 | 9/1992 | Trakas | 425/572 |
| 5,227,179 | 7/1993 | Benenati | 425/570 |
| 5,227,181 | 7/1993 | Knudsen | 425/572 |
| 5,269,677 | 12/1993 | Gauler | 425/572 |

*Primary Examiner*—Tim Heitbrink
*Attorney, Agent, or Firm*—Locke Reynolds

[57] ABSTRACT

A manifold assembly for supplying plastic material from a plastic source to a mold assembly in an injection molding machine includes a flexible manifold having an interior conduit connected between the plastic source and the mold assembly. The flexible manifold is configured to define an input connector, a first curved segment attached to the input connector, a second curved segment, an output connector attaching the second curved segment to the mold assembly, and an intermediary segment connecting the first and second curved segments. This provides the flexible manifold with a generally S-shaped configuration that flexes with temperature changes to maintain a substantially constant positioning between the input connector and the output connector, preventing thermally induced movement of the mold assembly with respect to the input connector as heated plastic is injected through the conduit.

16 Claims, 5 Drawing Sheets

FLEXIBLE HOT MANIFOLD ASSEMBLY FOR INJECTION MOLDING MACHINES

BACKGROUND OF THE INVENTION

The present invention relates to hot manifold assemblies for plastic injection molding machines and for the injection stage of plastic injection blow molding machines. More particularly, the present invention relates to a hot manifold assembly having inherent flexibility over a wide temperature range permitting the fixed positioning of the manifold with respect to both an associated plasticating injection unit and a multi-inlet or multi-cavity mold assembly.

Conventional multiple cavity molds are widely used in injection molding machines to simultaneously produce a plurality of similar articles. To supply these multiple cavity molds, heated plastic must be equally distributed to each mold assembly, with precise plastic volumes, packing pressures, and temperature ranges being maintained over many molding and release cycles. It is conventional to achieve the precise volumes and pressures by adopting constant path length designs for the manifold assembly, typically using an X or H manifold design format. It is also desirable to minimize sharp corners in the manifold to reduce the shearing action on the plastic as it travels through the manifold. Since this heated plastic would ordinarily cool to an unacceptably low temperature during transport through such a manifold to each separate mold assembly, it has been known to artificially heat the manifolds to help maintain the plastic within a defined temperature range to maintain the desired fluid and other characteristics.

However, heating typical X and H design format manifolds can cause alignment problems between the hot manifold outlets and the inlets of the mold assembly. When the manifold is heated, it expands, the amount of expansion generally being a function of the net path length between the manifold inlet and each of the outlets. This expansion varies the alignment or positioning of each manifold outlet in relation to the adjacent mold assembly inlet, and can cause difficulties in sealing the manifold to the mold assembly and in operation of the gate valves controlling the introduction of the plastic into the mold assembly inlets.

Various solutions to this problem have been proposed. For example, Bright, et al., U.S. Pat. No. 4,219,323, discloses a block-like for coupling various portions of a hot manifold together, the link including slots allowing for expansion and contraction compensation. Roy, U.S. Pat. No. 4,333,629, discloses a floating manifold which is telescopically coupled to the supply tube and to delivery tubes associated with each cavity to permit relative movement under varying temperature conditions. Schad, U.S. Pat. No. 4,588,367, discloses a conventional manifold coupled to a multi-cavity mold by thermal expansion support elements at the joint between the manifold and the nozzle which include undercuts which provide the required flexibility. Benenati, U.S. Pat. No. 5,032,078, discloses a manifold sealed with metals having a dissimilar coefficient of expansion to improve sealing efficacy, and supporting removable tips that can be fitted to adjust the overall length of heated bushings that are included in the manifold. Gauler, U.S. Pat. No. 5,269,677, discloses a hot manifold system having sprue bushings including annular grooves adjacent the connection with a conventional block manifold which create points of flexure to accommodate dimensional changes due to temperature changes during use. However, none of these structures has proven to be entirely satisfactory in all melding situations requiring compensation for thermal expansion.

What is needed is a manifold assembly that inexpensively provides plastic maintained within a predetermined temperature range to multiple mold assemblies. The manifold assembly must have outlets which are fixed in position with respect to the mold assemblies yet must allow for thermally induced stresses to be released. Further, the distributing manifold should allow an arbitrary number of mold assemblies to be accommodated thereby according the designer full flexibility in utilizing machines of various size and capacity.

SUMMARY OF THE INVENTION

The present invention provides such a manifold assembly for supplying plastic material from a source of molten plastic to a mold assembly in an injection molding machine. The term injection molding machine is used here to include injection-blow molding machines, injection-stretch-blow molding machines, and other machines which include an injection molding step or process. The manifold assembly includes a base which is adapted to be secured to the injection molding machine. A manifold inlet is coupled to the base and adapted to be coupled to a source of molten plastic such as a plasticating injection unit to provide a flow path for the molten plastic. A plurality of manifold outlets are coupled to the base and adapted to be fixed to inlets of a mold assembly. The inlets of the mold assembly can lead to a common mold cavity or to individual cavities. At least one flow divider is coupled to the manifold inlet for dividing the flow into a plurality of flow paths. A plurality of flexible manifold conduits are connected between the flow divider and the manifold outlets, each flexible conduit including at least one flexible curved portion for permitting thermally induced changes in conduit length while maintaining a constant positioning between the manifold input and the manifold output.

The flexible conduit can include a portion having a generally S-shaped or C-shaped configuration that flexes with temperature changes thus permitting the maintenance of a constant position between the manifold input and the manifold output. In the preferred embodiments, the flexible conduit comprises a seamless metal tube having a wall thickness and strength sufficient to withstand the pressure applied to the molten plastic during the injection and packing cycle. A preferred metal for the tubing is cold drawn, normalized 4130 steel although other alloys might be advantageously employed. All of the tubes forming flexible conduits coupled to a single flow divider are of uniform preselected length to insure identical flow characteristics and thermal history for the resin flowing through any given flow divider.

Each of the seamless metal tubes includes a spiral groove along substantially the entire length of the tube. The spiral groove receives a heater element which can be in the form of a chrome-nickel resistance wire encased in an electrical insulating material such as magnesium oxide. The heater element wound around the tube provides heat to the tube and any plastic resin within the tube to maintain the resin within a temperature range best suited for the molding conditions. The flexible conduits with the spirally wound heater elements are surrounded by a layer of insulation to minimize any outward radiation or convection of heat, and thereby enhance the overall energy efficiency of the manifold.

In particularly preferred embodiments, the spiral groove is cut and the heating element is wound about the flexible conduit so that coil density varies between the flow divider and the manifold output. This differential density winding helps insure that the plastic resin flowing through the interior conduit of the flexible manifold is supplied with no more than the required amount of heat to maintain the desired temperature as the resin moves away from the plastic source toward each mold assembly.

A particularly advantageous method of manufacturing the flexible manifold conduits comprises the steps of: cutting a plurality of seamless metal tubes to a uniform preselected length, machining a spiral groove along substantially the entire length of each of the seamless metal tubes, imbedding a wire in each groove the wire being formed of a material having a hardness greater than the metal tube hardness, bending the tubes to include a curve providing for thermal expansion and contraction between the tube ends, and replacing the wire with a heater element for providing heat to the tube and any contents.

Each end of the seamless metal tubes are machined as necessary to receive any necessary fittings after the bending step. The fittings generally comprise a gate nozzle which is furnace brazed to one end of the tube after the tube is bent but prior to the addition of the heater element which heater element preferably envelopes the gate nozzle as well being inserted into the groove in the metal tube. The other end of the seamless metal tube is received in an adaptor coupling the tube to the flow divider.

The presence of the hardened wire in the spiral groove during the bending procedure prevents collapse of the groove which would otherwise prevent the correct subsequent placement of the heater element. The bending operation is accomplished with the aid of a standard tube bender capable of controlling the radius and arc length of each bend to thereby fashion the flexible manifold conduit to have a cold conformation allowing easy construction of the whole manifold assembly.

The spiral groove performs only a minor role in allowing for the thermal expansion and contraction of the flexible conduit during use since the groove is filled with the heater element. The thermal flexibility is instead provided by the relatively large C-shaped and S-shaped curves which are provided by the tube bending operation, the radius of the curves being several times the diameter or the of the conduit. Additional features and advantages of the present invention will become more apparent upon consideration of the accompanying drawings and the following description of those drawings exemplifying the preferred embodiment of the present invention.

DESCRIPTION OF PREFERRED EMBODIMENT

Figure 1:
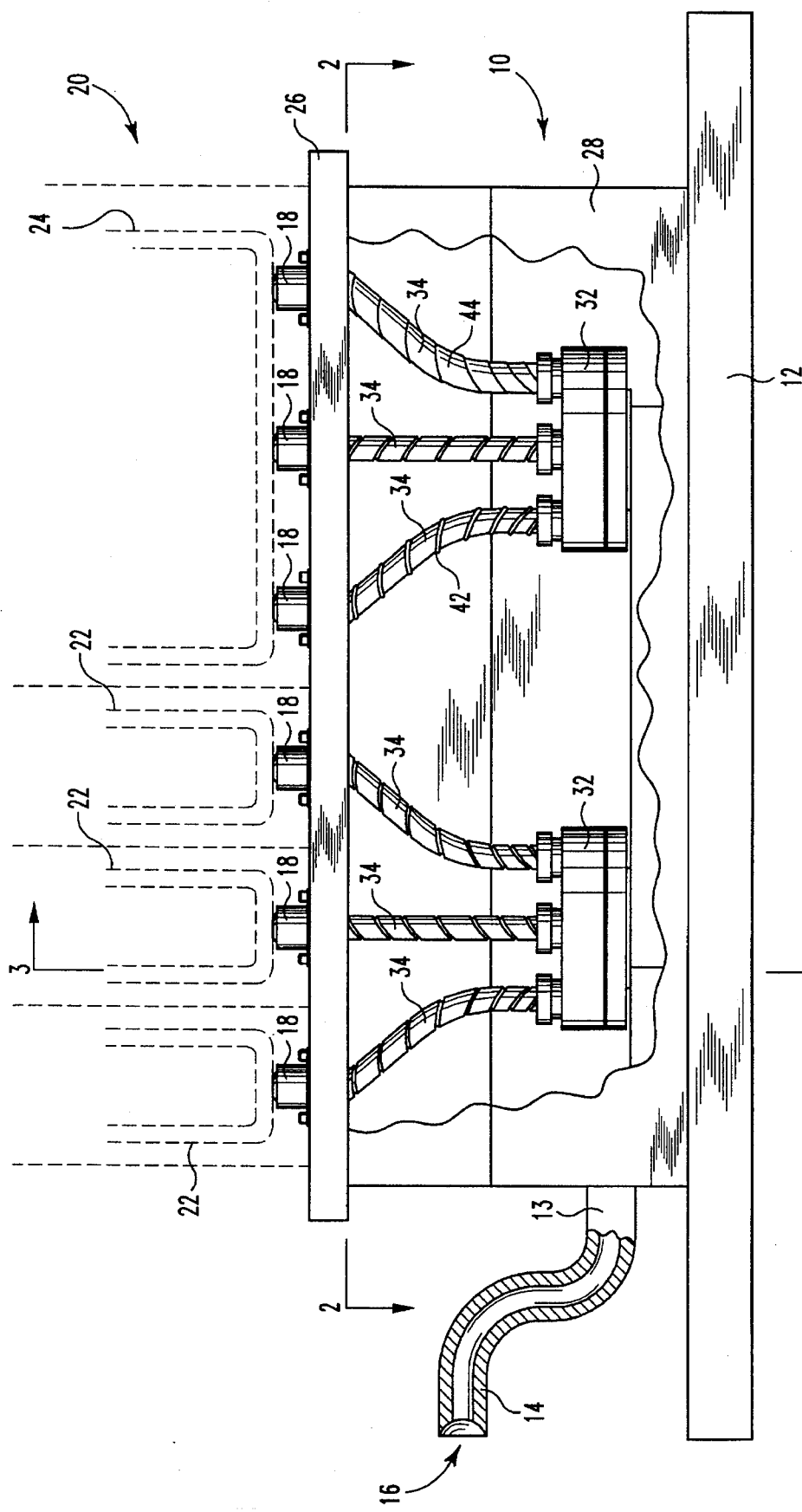
FIG. 1 is a side elevation view of a flexible hot manifold assembly according to the present invention supporting a plurality of mold cavities shown in phantom.
Figure 2:
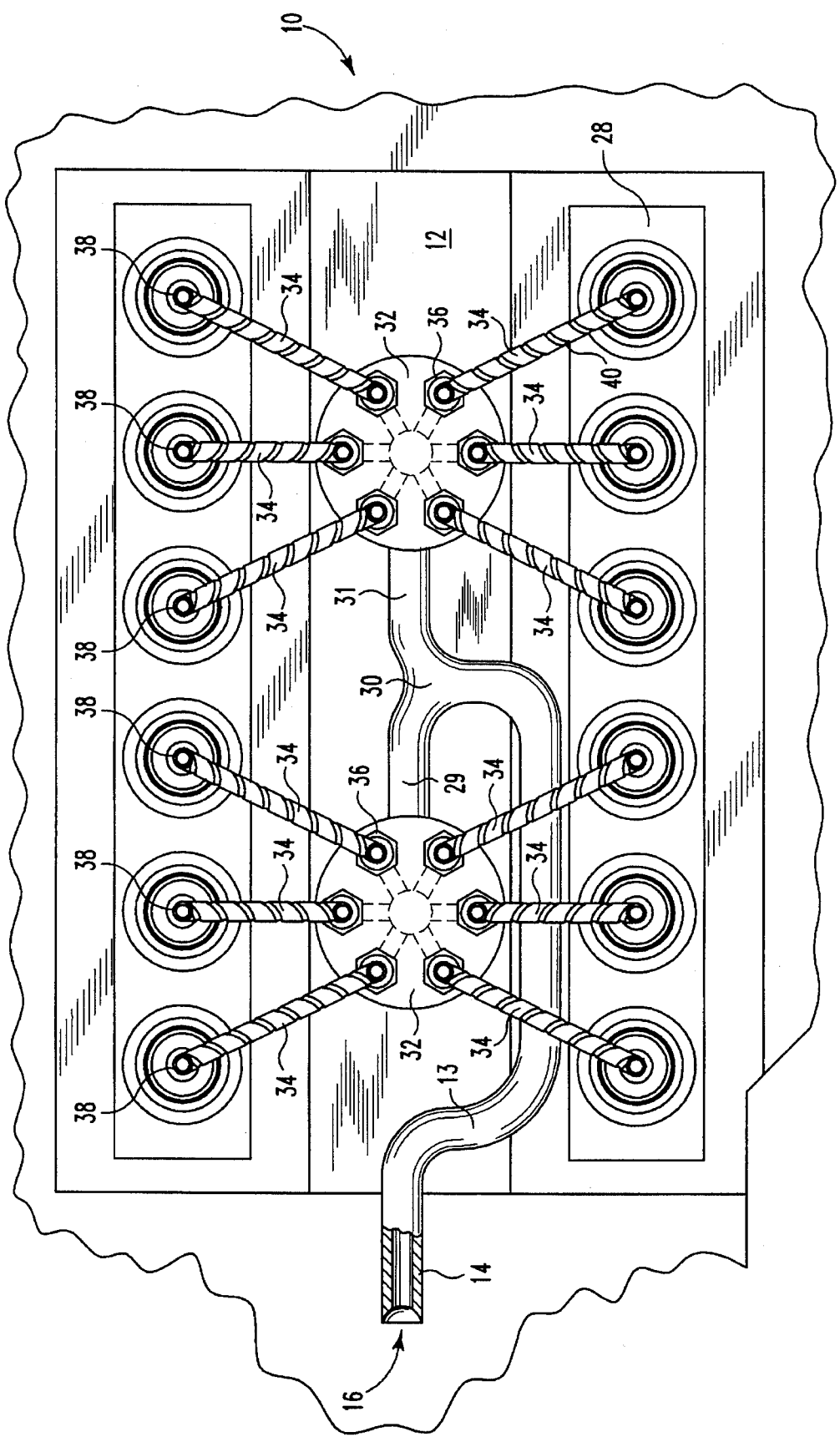
FIG. 2 is a plan view of the assembly taken along line 2—2 shown in FIG. 1 with the mold support plate removed to show the entire length of the flexible manifold conduits.
Figure 3:
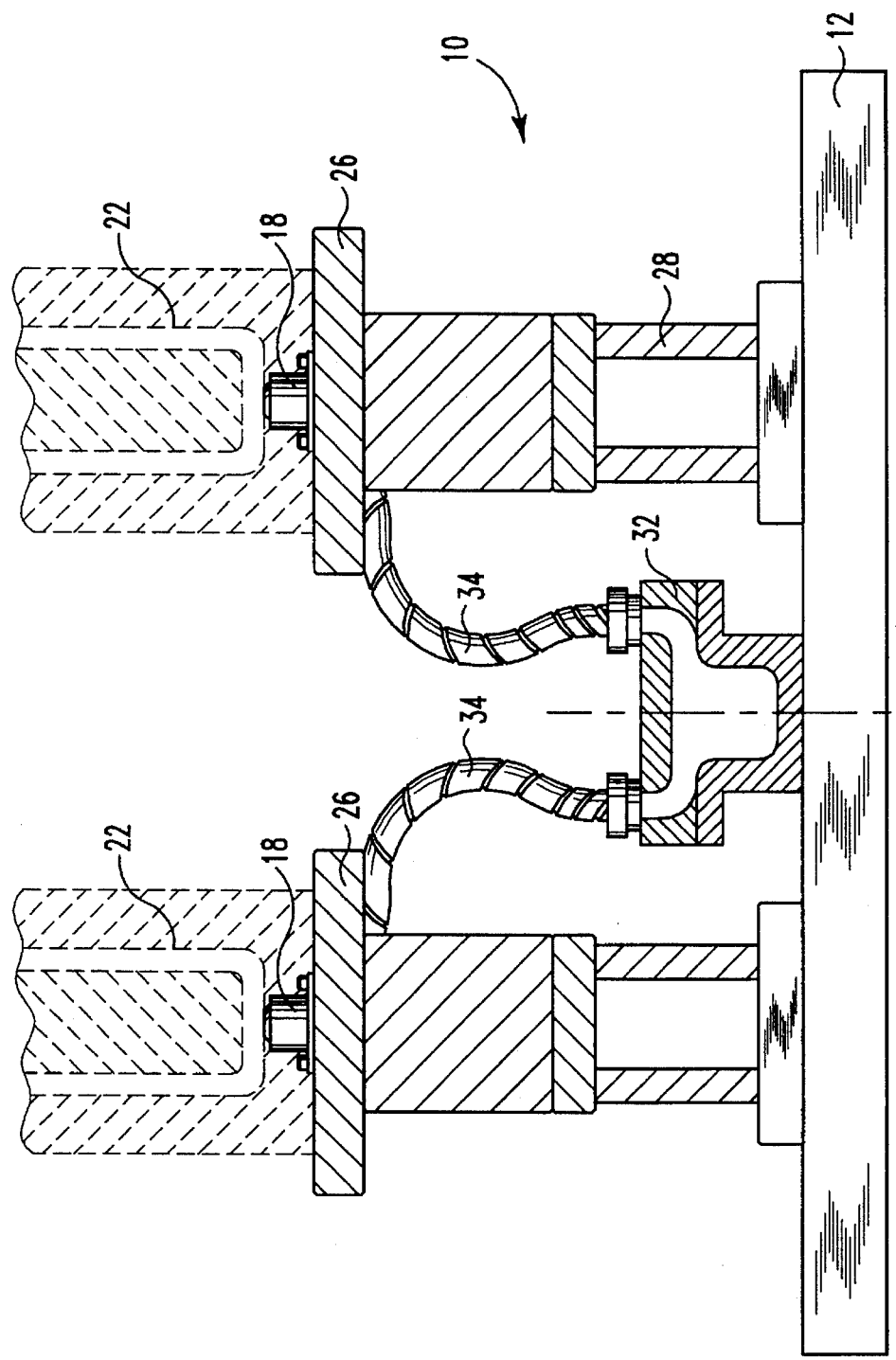
FIG. 3 is a sectional view of the assembly taken along line 3—3 shown in FIG. 1.

A hot manifold assembly 10 in accordance with the present invention is shown in FIGS. 1—3 to include a base 12 which is intended to be fixed to the framework of an injection molding machine. A manifold 13 is fixed to the base 12 and includes an inlet portion 14 adapted to be coupled to a source (not shown) to receive molten plastic through opening 16. The assembly 10 also includes a plurality of manifold outlets 18 which generally take the form of gate valves. The outlets 18 are intended to be intimately coupled to and form the inlets of a mold assembly 20 shown in phantom. The mold assembly 20 can have one or more mold inlets into a single mold cavity as shown at the right side of FIG. 1. For smaller articles, each mold cavity 22 generally has only a single mold inlet, but for larger cavities such as cavity 24, a plurality of mold inlets can be employed to provide sufficient molten plastic to form the article sought to be manufactured. The manifold outlets 18 are fixed to an outlet support plate 26 which can also constitute a support plate for the cavities 22 and 24. The outlet support plate 26 is fixed to the base 12 through a stand 28 so that the position of the manifold outlets 18 is fixed with respect to the base 12.

As better shown in FIG. 2, the manifold 13 includes, in addition to inlet portion 14, branch portions 29 and 31 situated on either side of junction 30 leading to a pair of flow dividers 32. The manifold portions 14, 29 and 30 are constructed so that the length of the flow paths of the molten plastic from the opening 16 to the flow dividers 32 are all equal. The flow dividers 32 further divide the flow of molten plastic into a plurality of streams leading to outlets 18. The flow dividers 32, being fixed to the opposite ends of portions 29 and 31 on either side of the junction 30, are subject to some variation in position relative to each other based merely on the thermal expansion characteristics of the length of the manifold existing between the two flow dividers 32. It will be appreciated by those skilled in the art that where additional bifurcations or junctions 30 are provided, even more opportunities for thermal variation in position of the flow dividers 32 is potentially possible.

A plurality of flexible manifold conduits 34 are provided which are coupled to flow divider outlets 36 to allow for the variation in position of the flow dividers 32 with respect to the outlets 18. While the straight line distance between each flow divider outlet 36 and manifold outlet 18 is not identical the flexible conduits 34 are all of identical length thereby insuring that the flow path length from opening 16 to outlet 18 is identical for all flow paths. Each of the flexible manifold conduits 34 runs between a flow divider outlet 36 and a gate valve orifice 38. Since the flexible conduits 34 are constructed to have a length exceeding the straight line distance between the outlets 36 and the gate valve orifice 38, each flexible conduit 34 includes bends or curves of radius R. $R_1$, $R_2$, and $R_3$, as shown in FIGS. 4 and 5, which allow the conduit 34 to flex with temperature changes thus permitting the maintenance of a constant position between the manifold inlet opening 16 and the manifold outlets 18.

Generally, the flexible conduits 34 comprise a seamless metal tube having a wall thickness and strength sufficient to withstand the pressure applied to the molten plastic during the injection and packing cycle which is generally about 1400 Bars. Each flexible conduit 34 includes a spiral groove 40 along substantially the entire length of tube 34. The spiral groove 40 receives a wire heater element 42 as shown in FIG. 1. The wire heater element 42 extends from the flow divider 32 up to and around the gate valve orifice 38. The groove depth is determined by the size of heater wire to be applied. The pitch of the spiral forming the groove can vary in accordance with the thermal energy density needed to maintain the plastic within the conduit at the desired temperature. Each flexible conduit 34 and resistance heater wire 42 is surrounded by a layer of insulation 44 which minimizes outward flow of heat to the general environment and directs the heat toward maintaining the polymer within tube 34 at the desired temperature. In testing, a manifold assembly 10 of the present invention consumed only about one-half the electrical power used by a conventional H-shaped manifold in the same molding machine.

Figure 4:
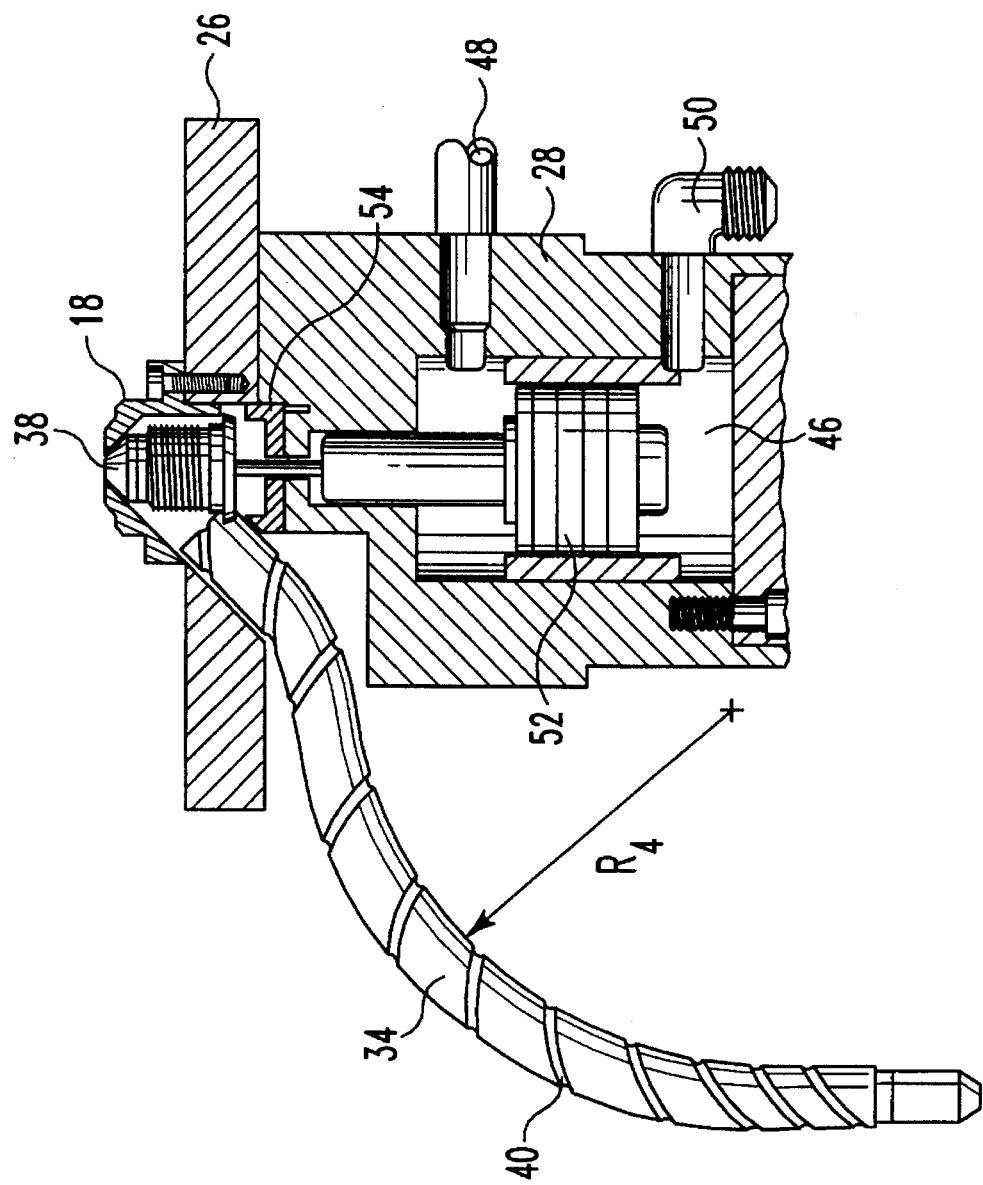
FIG. 4 is a detail view, partly in section, of a flexible manifold conduit and associated gate valve.
Figure 5:
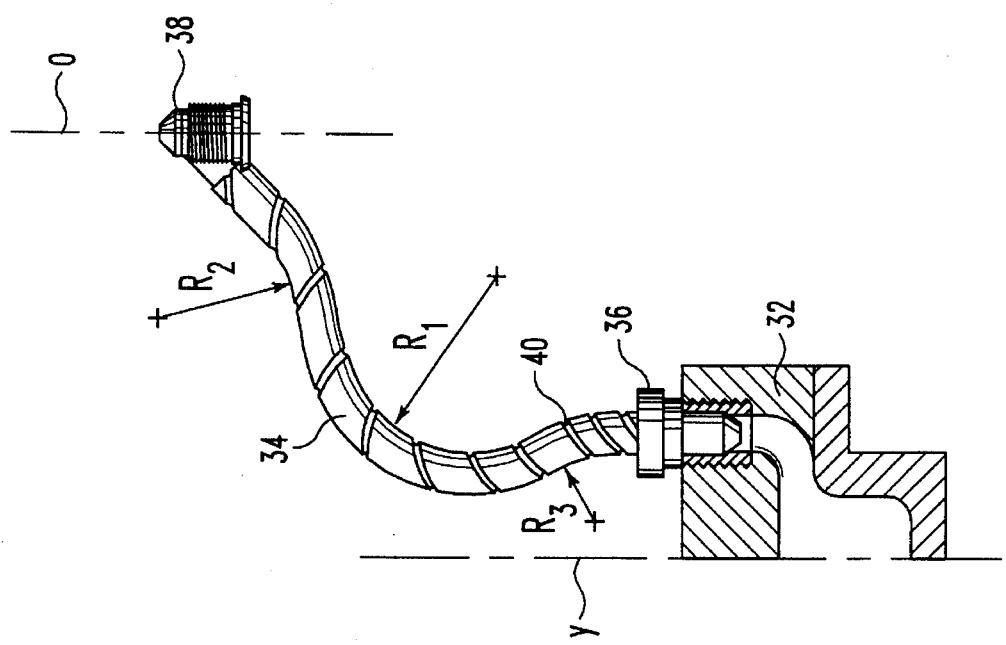
FIG. 5 is a detail view, partly in section, of a flexible manifold conduit and associated flow distributor.

The general shape of the flexible conduits can be C-shaped as generally shown in FIG. 4 or S-shaped as shown generally in FIG. 5. In the particular illustrated embodiment, the gate valve orifice 38 will have an alignment axis 0 generally parallel with the axis Y of symmetry of the flow divider 32. As shown in greater detail in FIG. 4, the gate valve orifice 38 fixed at one end of the flexible conduit 34 becomes an integral part of the manifold outlet 18. Included in an upper portion of stand 28 is a cylinder 46 which can be supplied pneumatically or hydraulically through lines 48 and 50 to cause piston 52 to reciprocate. The reciprocation of piston 52 causes gate valve needle 54 to be inserted into and withdrawn from gate valve orifice 38 thereby controlling the outward flow of polymer from the flexible conduit 34 and into the mold cavity 22.

It will be appreciated by those skilled in the art that the cast or welded manifold 13 could also be replaced by additional flexible manifold conduits constructed in accordance with this invention. The use of such additional flexible manifold conduits would further enhance the thermal flexibility of the system and would further reduce the energy demand required to maintain the plastic material at the optimum injection molding temperature.

While the present invention has been described in connection with the illustrated specific embodiment, it should be understood that the specific examples are not intended to limit the invention as set forth in the following claims.

The claimed invention is:

1. A manifold assembly for providing a flow path for plastic material from a source of molten plastic to a mold assembly in an injection molding machine, the manifold assembly comprising: a base, a manifold inlet coupled to the base and adapted to be coupled to said source, a plurality of manifold outlets coupled to the base and adapted to be fixed to inlets of said mold assembly, at least one flow divider coupled to the manifold inlet, and a plurality of flexible manifold conduits connected between the flow divider and the manifold outlets, each conduit including at least one flexible curved portion for permitting thermally induced changes in conduit length, each end of each conduit being maintained at a constant position at the flow divider and the manifold outlet.

2. The manifold assembly of claim 1 wherein the base comprises a plate adapted to be fixed in the molding machine in spaced relation from the mold assembly, the base being coupled to the mold assembly through the manifold outlets.

3. The manifold assembly of claim 1 wherein the manifold inlet comprises a manifold inlet portion providing a flow channel for molten plastic including at least one bifurcation dividing said flow channel into two smaller channels of equal proportion.

4. The manifold assembly of claim 1 wherein said flow divider comprises an input chamber coupled to the manifold inlet and a plurality of outputs spaced around and coupled to the input chamber, one of said flexible manifold conduits being connected to each of the outputs.

5. The manifold assembly of claim 4 wherein the input chamber defines a central axis of the flow divider, the plurality of outputs being equally spaced around and extending radially outward from the central chamber.

6. The manifold assembly of claim 1 wherein each of the manifold outlets comprises a gate valve assembly for controlling the flow of plastic out of the manifold outlet.

7. The manifold assembly of claim 1 wherein each of the flexible manifold conduits comprises a seamless metal tube, all of the tubes being of uniform preselected length.

8. The manifold assembly of claim 7 wherein each of the seamless metal tubes includes a spiral groove along substantially the entire length of the tube.

9. The manifold assembly of claim 7 further comprising a heater element wound around the tube for providing heat to the tube and any contents.

10. A manifold assembly for supplying plastic material from a source of molten plastic to a mold assembly in an injection molding machine, the manifold assembly comprising: a base plate adapted to be fixed in the molding machine in spaced relation from the mold assembly, a manifold inlet portion fixed to the base and adapted to be coupled to said source of molten plastic, the manifold inlet portion providing at least one flow channel for molten plastic terminating in a flow channel outlet, a plurality of manifold outlets fixed to the base and adapted to be fixed to inlets of said mold assembly, at least one flow divider coupled to the flow channel outlet of the manifold inlet portion at a position spaced by a minimum distance from the manifold outlets, and a plurality of flexible manifold conduits connected between the flow divider and the manifold outlets, each conduit comprising a seamless metal tube, all of the tubes being of uniform preselected length exceeding said minimum distance and including at least one flexible curved portion for permitting thermally induced changes in conduit length while each end of each conduit is maintained at a constant position at the flow divider and the manifold outlet.

11. The manifold assembly of claim 10 further comprising a support coupling the base to the mold assembly through the manifold outlets.

12. The manifold assembly of claim 10 wherein the manifold inlet portion includes at least one bifurcation dividing said flow channel into two smaller channels of equal proportion.

13. The manifold assembly of claim 10 wherein each flow divider comprises an input chamber coupled to one of the manifold outlets and a plurality of outputs spaced around and coupled to the input chamber, one of said flexible manifold conduits being connected to each of the outputs.

14. The manifold assembly of claim 13 wherein the input chamber defines a central axis of the flow divider, the plurality of outputs being equally spaced around and extending radially outward from the input chamber.

15. The manifold assembly of claim 10 wherein each of the manifold outlets comprises a gate valve assembly for controlling the flow of plastic out of the manifold outlet.

16. The manifold assembly of claim 10 wherein each of the seamless metal tubes includes a spiral groove along substantially the entire length of the tube, a heater element being situated in the groove for providing heat to the tube and any contents.

* * * * *